United States Patent
Lee et al.

(10) Patent No.: US 11,727,847 B2
(45) Date of Patent: Aug. 15, 2023

(54) ELECTRONIC DEVICE AND METHOD FOR CHANGING GAMMA ACCORDING TO REFRESH RATE

(71) Applicant: Samsung Electronics Co., Ltd., Gyeonggi-do (KR)

(72) Inventors: Seoyoung Lee, Gyeonggi-do (KR); Minwoo Lee, Gyeonggi-do (KR); Donghyun Yeom, Gyeonggi-do (KR); Kwangtai Kim, Gyeonggi-do (KR); Minwoo Kim, Gyeonggi-do (KR); Seungryeol Kim, Gyeonggi-do (KR); Juseok Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/859,112

(22) Filed: Jul. 7, 2022

(65) Prior Publication Data

US 2023/0005408 A1    Jan. 5, 2023

Related U.S. Application Data

(63) Continuation of application No. PCT/KR2022/009056, filed on Jun. 24, 2022.

(30) Foreign Application Priority Data

Jul. 5, 2021   (KR) .......................... 10-2021-0088018

(51) Int. Cl.
   *G09G 3/20*    (2006.01)

(52) U.S. Cl.
   CPC ... *G09G 3/2007* (2013.01); *G09G 2320/0233* (2013.01); *G09G 2320/046* (2013.01);
   (Continued)

(58) Field of Classification Search
   CPC ......... G09G 3/2007; G09G 2320/0233; G09G 2320/046; G09G 2320/0673; G09G 2360/144; G09G 2360/16
   See application file for complete search history.

(56) References Cited

U.S. PATENT DOCUMENTS

| | | |
|---|---|---|
| 2006/0119612 A1 | 6/2006 | Kerofsky et al. |
| 2006/0284882 A1 | 12/2006 | Kerofsky et al. |

(Continued)

FOREIGN PATENT DOCUMENTS

| | | |
|---|---|---|
| KR | 10-1407313 B1 | 6/2014 |
| KR | 10-2020-0002052 A | 1/2020 |

(Continued)

OTHER PUBLICATIONS

International Search Report dated Sep. 23, 2022.

*Primary Examiner* — Chanh D Nguyen
*Assistant Examiner* — Ngan T. Pham-Lu
(74) *Attorney, Agent, or Firm* — Cha & Reiter, LLC

(57) ABSTRACT

Certain embodiments relate to an electronic device and a method for changing gamma values and may include determining a target gamma curve related to first image data to be displayed by a display panel, receiving a request for switching a scan rate of the display panel from a first frequency to a second frequency, determining a gamma offset and an offset margin in response to reception of the request, determining a limit gamma curve generated by applying the gamma offset and the offset margin to the first gamma curve, generating second image data by correcting the first image data, based on a difference value between the limit gamma curve and the target gamma curve to map the first image data to the target gamma curve, and driving the display panel,
(Continued)

based on the second image data and the limit gamma curve. This document may further include various other embodiments.

20 Claims, 12 Drawing Sheets

(52) U.S. Cl.
CPC ............... *G09G 2320/0673* (2013.01); *G09G 2360/144* (2013.01); *G09G 2360/16* (2013.01)

(56) References Cited

U.S. PATENT DOCUMENTS

| | | | |
|---|---|---|---|
| 2007/0291048 | A1 | 12/2007 | Kerofsky |
| 2011/0273440 | A1* | 11/2011 | Park ..................... G09G 3/3696 345/212 |
| 2013/0321483 | A1* | 12/2013 | You ..................... G09G 3/2074 345/690 |
| 2014/0160178 | A1 | 6/2014 | Hong et al. |
| 2017/0124934 | A1* | 5/2017 | Verbeure .............. G09G 3/3611 |
| 2018/0268780 | A1* | 9/2018 | Bae ........................ G09G 5/026 |
| 2020/0005723 | A1 | 1/2020 | Kim et al. |
| 2020/0058249 | A1 | 2/2020 | Ok et al. |
| 2021/0201823 | A1 | 7/2021 | Han et al. |
| 2021/0352251 | A1* | 11/2021 | Wu ..................... H04N 9/3114 |

FOREIGN PATENT DOCUMENTS

| | | |
|---|---|---|
| KR | 10-2020-0017890 A | 2/2020 |
| KR | 10-2020-0019321 A | 2/2020 |

* cited by examiner

FIG. 8A
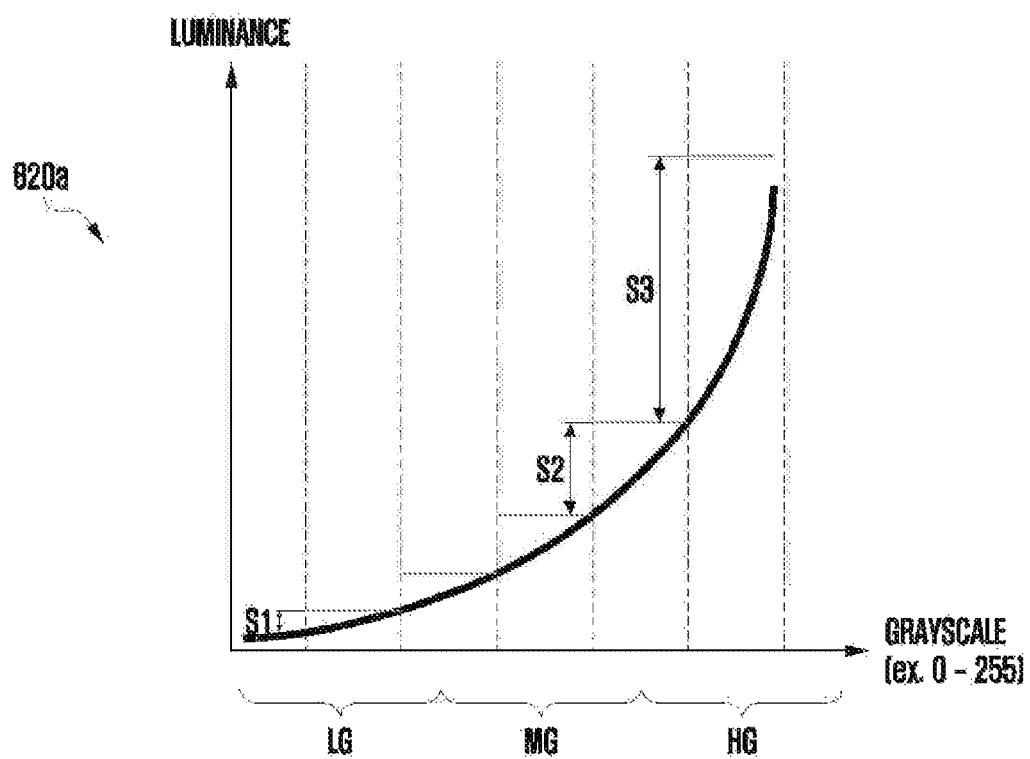

FIG. 8B
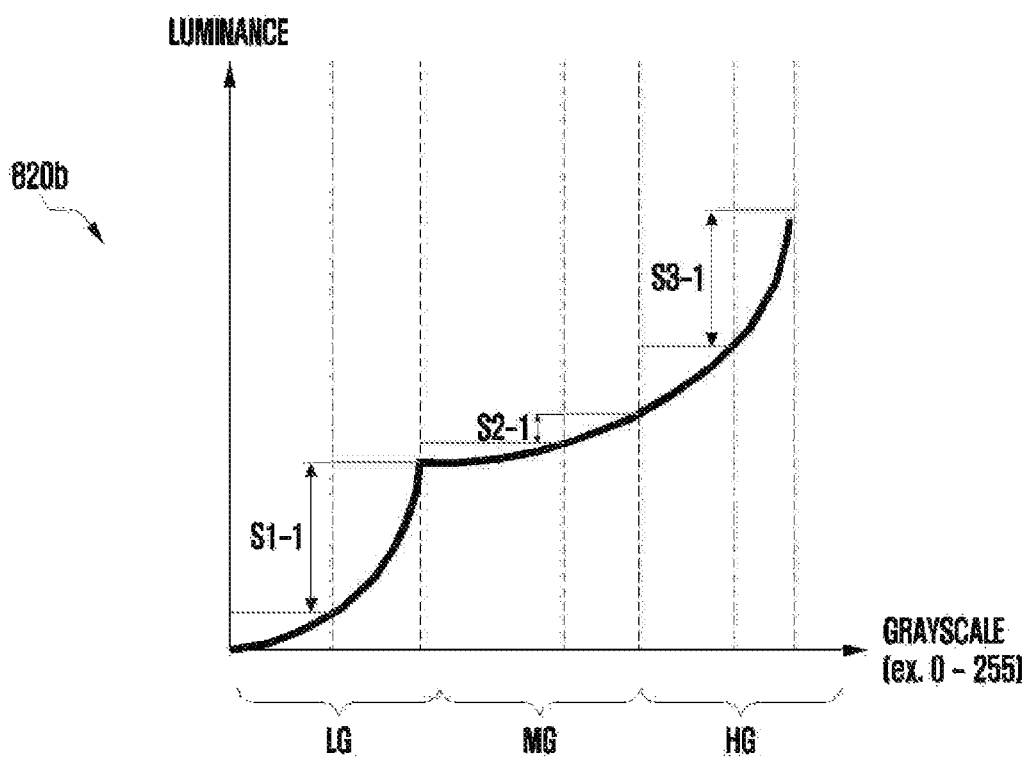

FIG. 9A
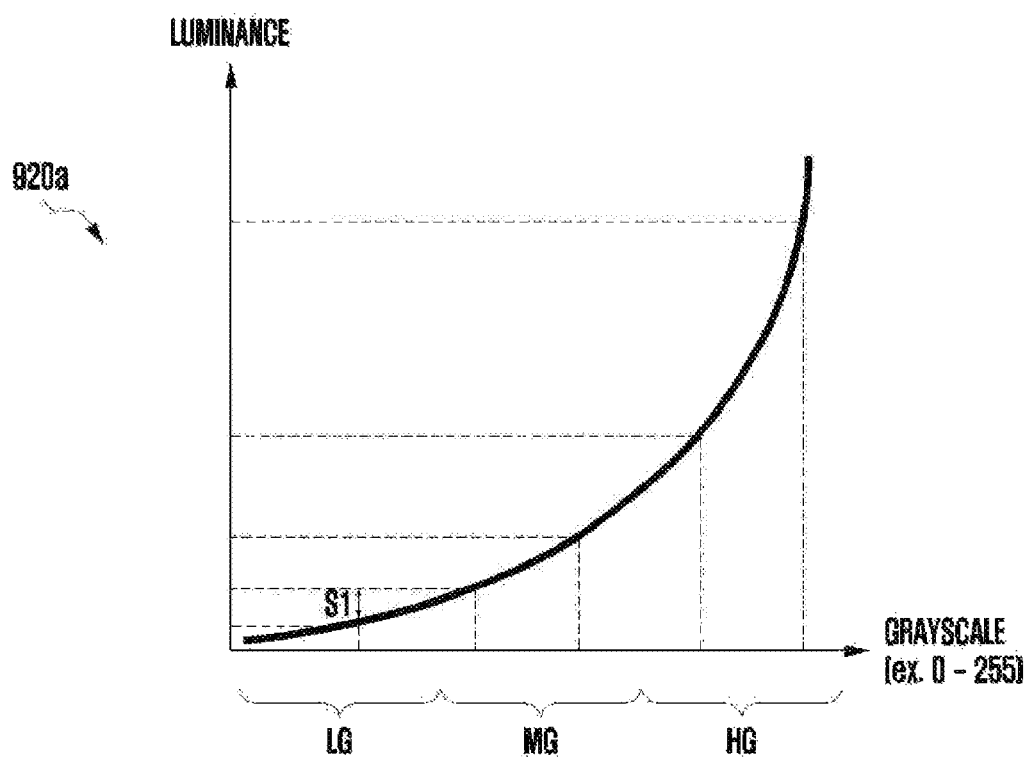

FIG. 9B
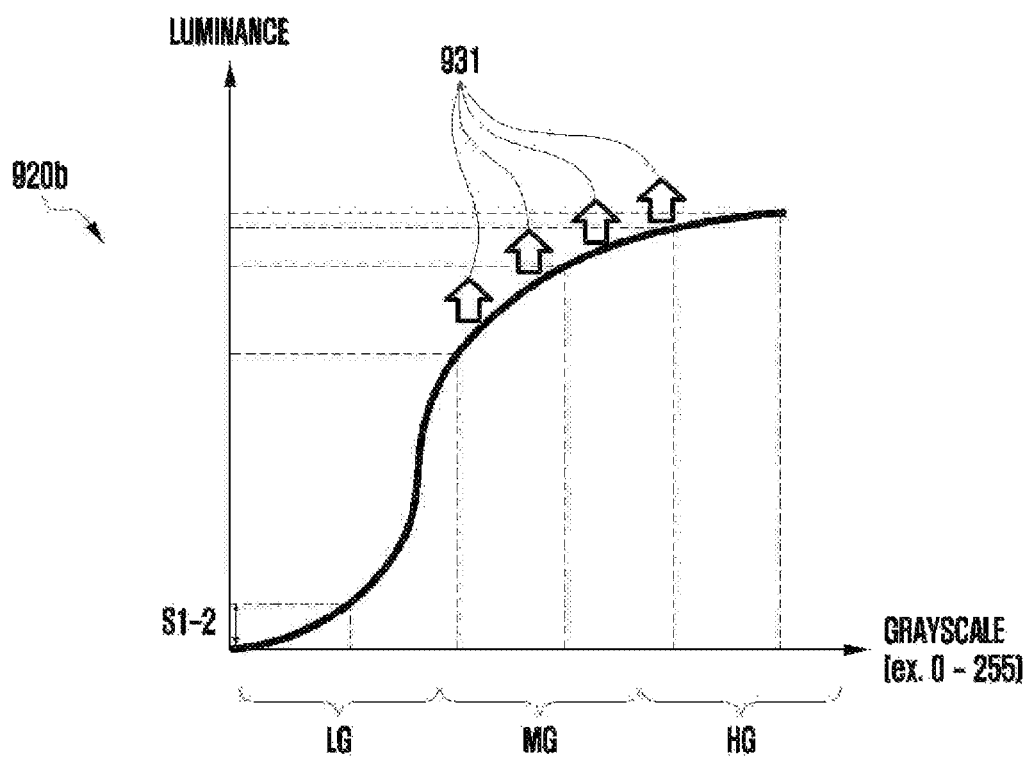

ELECTRONIC DEVICE AND METHOD FOR CHANGING GAMMA ACCORDING TO REFRESH RATE

CROSS-REFERENCE TO RELATED APPLICATION(S)

This application is a continuation of and claims priority under 35 U.S.C. § 120 to PCT International Application No. PCT/KR2022/009056, which was filed on Jun. 24, 2022, and claims priority to Korean Patent Application No. 10-2021-0088018, filed on Jul. 5, 2021, in the Korean Intellectual Property Office, the disclosure of which are incorporated by reference herein their entirety.

BACKGROUND

Technical Field

One or more embodiments of the instant disclosure generally relate to an electronic device and a method for changing gamma according to the device's refresh rate.

Description of Related Art

A display installed in an electronic device may display images according to a luminance curve, that is, a gamma curve, that corresponds to the grayscale level of the displayed image data.

At the same time, electronic devices, e.g. mobile devices, are being developed to increase the resolution of their displays and support driving of the displays at variable frequencies (for example, 60 Hz to 240 Hz).

SUMMARY

An electronic device may perform image processing on image data to be displayed through its display to improve image equality and visibility. In one such image-processing method, targeted image quality may be obtained by mapping data corresponding to grayscale 0 to grayscale 255 while the data has fixed bit depth, for example, 8 bits may be mapped to different grayscales.

Image quality improvement by this image-processing method may be limited in that the luminance range is fixed. The method also has a problem of displaying the same luminance in different grayscale areas due to the data-based image processing.

An electronic device according to an embodiment includes a display panel, a display driver IC (DDI) configured to drive the display panel, a processor configured to generate first image data to be displayed by the display panel, and an image-processing module, wherein the image-processing module is configured to determine a target gamma curve related to the first image data, receive a request for switching a scan rate of the display panel from a first frequency to a second frequency, determine a gamma offset for changing a first gamma curve corresponding to the first frequency to a second gamma curve corresponding to the second frequency and an offset margin additionally configured by the display panel in response to reception of the request, determine a limit gamma curve generated by applying the gamma offset and the offset margin to the first gamma curve, generate second image data by correcting the first image data, based on a difference value between the limit gamma curve and the target gamma curve to map the first image data to the target gamma curve, and drive the display panel, based on the second image data and the limit gamma curve.

A method of an electronic device according to an embodiment includes determining a target gamma curve related to first image data to be displayed by a display panel, receiving a request for switching a scan rate of the display panel from a first frequency to a second frequency, determining a gamma offset for changing a first gamma curve corresponding to the first frequency to a second gamma curve corresponding to the second frequency and an offset margin additionally configured by the display panel in response to reception of the request, determining a limit gamma curve generated by applying the gamma offset and the offset margin to the first gamma curve, generating second image data by correcting the first image data, based on a difference value between the limit gamma curve and the target gamma curve to map the first image data to the target gamma curve, and driving the display panel, based on the second image data and the limit gamma curve.

Additional aspects will be set forth in part in the description which follows and, in part, will be apparent from the description, or may be learned by practice of the presented embodiments.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 8A is an example illustrating first image data satisfying a first condition and a default gamma curve according to an embodiment.

FIG. 8B is an example illustrating a result obtained by correcting first image data satisfying a first condition to second image data by an image-processing module according to an embodiment.

FIG. 9A is an example illustrating first image data satisfying a second condition and a default gamma curve according to an embodiment.

FIG. 9B is an example illustrating a result obtained by correcting first image data satisfying a second condition to second image data by an image-processing module according to an embodiment.

DETAILED DESCRIPTION

Certain embodiments of the instant disclosure may provide an electronic device and a method for improving image quality. In the method, gamma value may be changed according to a scan rate.

An electronic device and a method according to certain embodiments of instant disclosure can improve image quality by using a method in which gamma is changed according to a scan rate.

The technical subjects pursued in this document are not limited to the above mentioned technical subjects, and other technical subjects which are not mentioned may be clearly understood through the following descriptions by those skilled in the art of this document.

Figure 1:
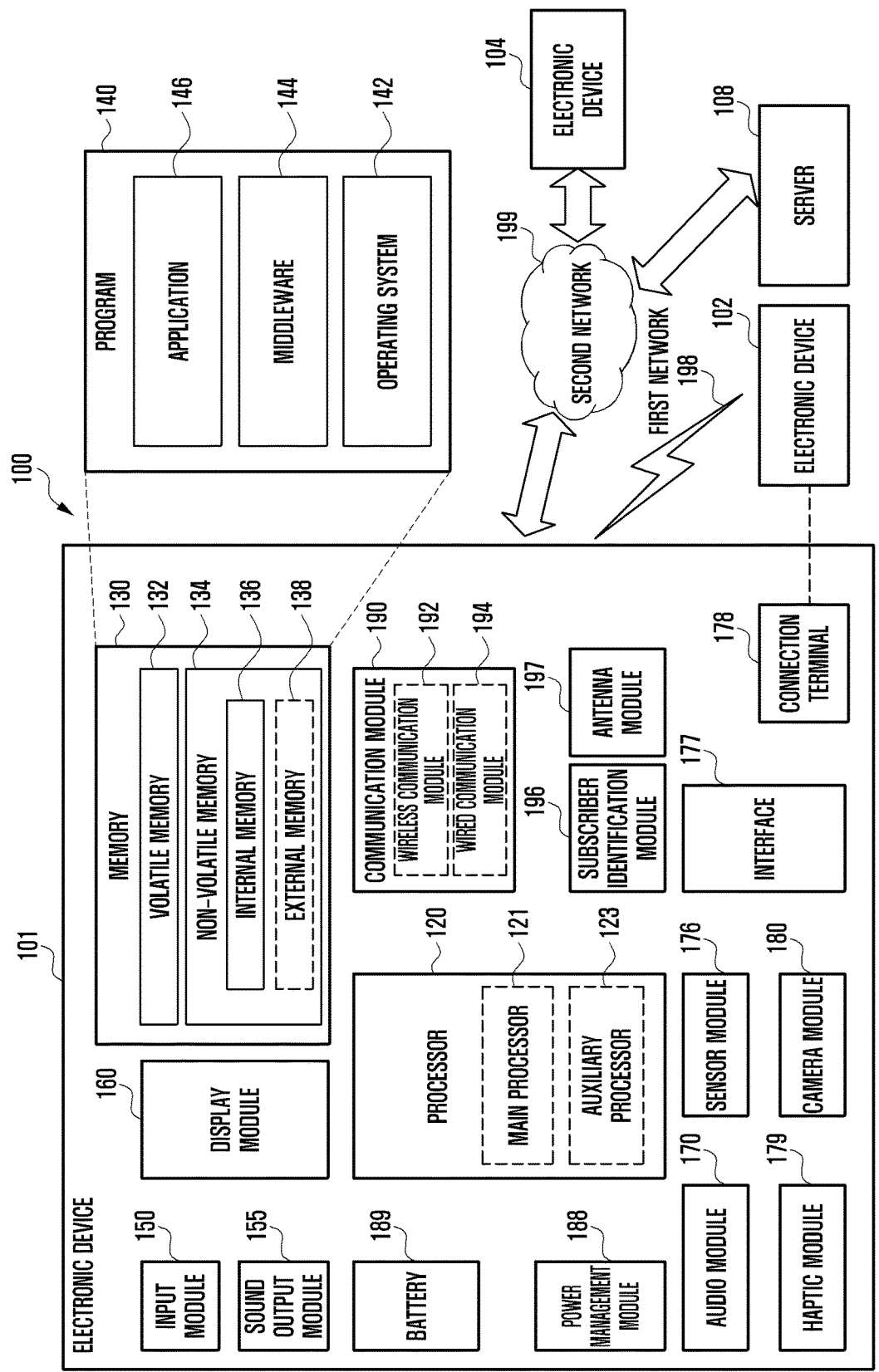
FIG. 1 is a block diagram illustrating an electronic device within a network environment according to an embodiment.

FIG. 1 is a block diagram illustrating an electronic device 101 in a network environment 100 according to an embodiment. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module(SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to certain embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with certain embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities, and some of the multiple entities may be separately disposed in different components. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

Figure 2:
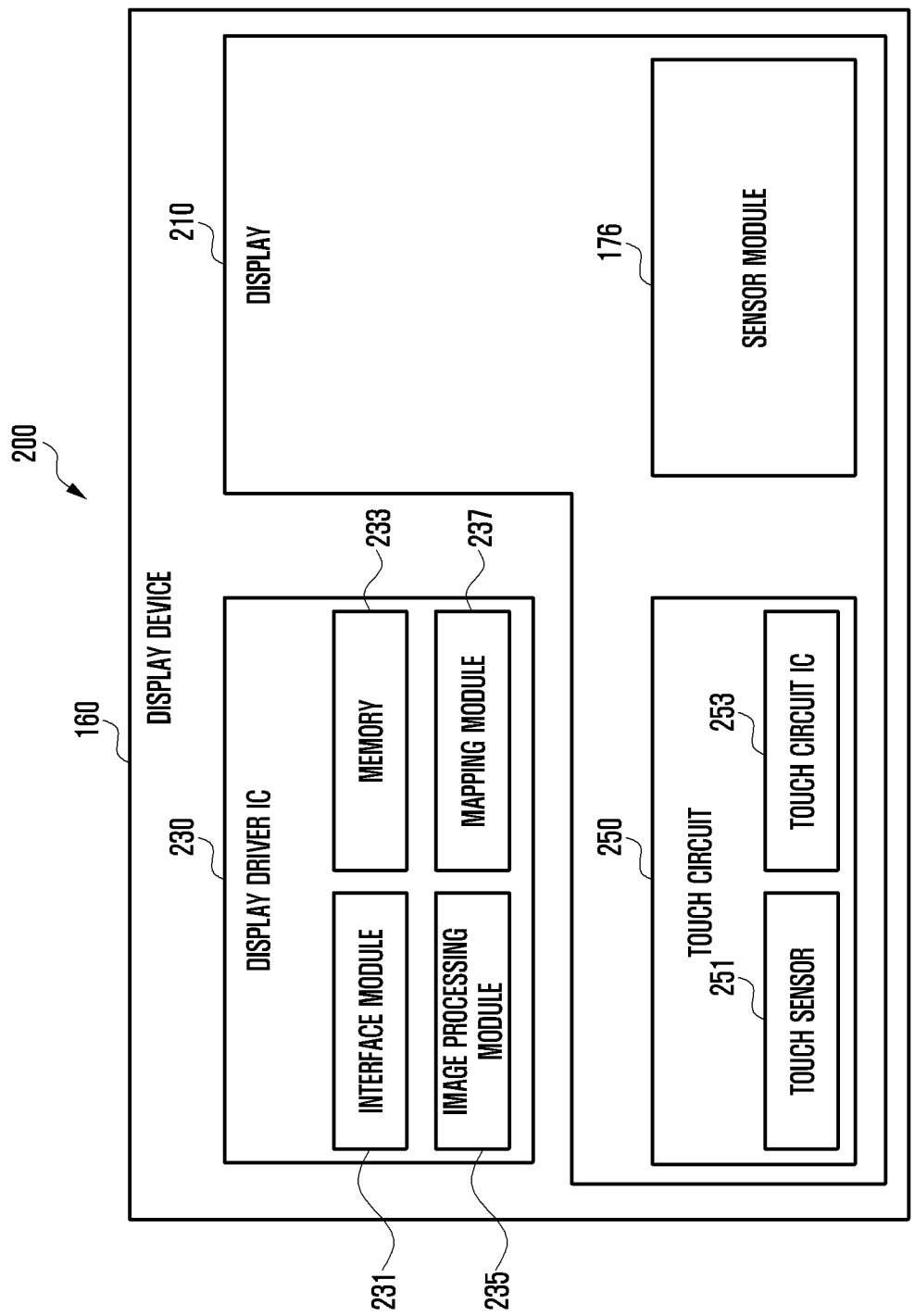
FIG. 2 is a block diagram illustrating a display device according to an embodiment.

FIG. 2 is a block diagram 200 illustrating the display device 160 according to an embodiment. Referring to FIG. 2, the display device 160 may include a display 210 and a display driver integrated circuit (DDI) 230 to control the display 210. The DDI 230 may include an interface module 231, memory 233 (e.g., buffer memory), an image processing module 235, or a mapping module 237. The DDI 230 may receive image information that contains image data or an image control signal corresponding to a command to control the image data from another component of the electronic device 101 via the interface module 231. For example, according to an embodiment, the image information may be received from the processor 120 (e.g., the main processor 121 (e.g., an application processor)) or the auxiliary processor 123 (e.g., a graphics processing unit) operated independently from the function of the main processor 121. The DDI 230 may communicate, for example, with touch circuitry 150 or the sensor module 176 via the interface module 231. The DDI 230 may also store at least part of the received image information in the memory 233, for example, on a frame by frame basis.

The image processing module 235 may perform pre-processing or post-processing (e.g., adjustment of resolution, brightness, or size) with respect to at least part of the image data. According to an embodiment, the pre-processing or post-processing may be performed, for example, based at least in part on one or more characteristics of the image data or one or more characteristics of the display 210.

The mapping module 237 may generate a voltage value or a current value corresponding to the image data pre-processed or post-processed by the image processing module 235. According to an embodiment, the generating of the voltage value or current value may be performed, for example, based at least in part on one or more attributes of the pixels (e.g., an array, such as an RGB stripe or a pentile structure, of the pixels, or the size of each subpixel). At least some pixels of the display 210 may be driven, for example, based at least in part on the voltage value or the current value such that visual information (e.g., a text, an image, or an icon) corresponding to the image data may be displayed via the display 210.

According to an embodiment, the display device 160 may further include the touch circuitry 250. The touch circuitry 250 may include a touch sensor 251 and a touch sensor IC 253 to control the touch sensor 251. The touch sensor IC 253 may control the touch sensor 251 to sense a touch input or a hovering input with respect to a certain position on the display 210. To achieve this, for example, the touch sensor 251 may detect (e.g., measure) a change in a signal (e.g., a voltage, a quantity of light, a resistance, or a quantity of one or more electric charges) corresponding to the certain position on the display 210. The touch circuitry 250 may provide input information (e.g., a position, an area, a pressure, or a time) indicative of the touch input or the hovering input detected via the touch sensor 251 to the processor 120. According to an embodiment, at least part (e.g., the touch sensor IC 253) of the touch circuitry 250 may be formed as part of the display 210 or the DDI 230, or as part of another component (e.g., the auxiliary processor 123) disposed outside the display device 160.

According to an embodiment, the display device 160 may further include at least one sensor (e.g., a fingerprint sensor, an iris sensor, a pressure sensor, or an illuminance sensor) of the sensor module 176 or a control circuit for the at least one sensor. In such a case, the at least one sensor or the control circuit for the at least one sensor may be embedded in one portion of a component (e.g., the display 210, the DDI 230, or the touch circuitry 150)) of the display device 160. For example, when the sensor module 176 embedded in the display device 160 includes a biometric sensor (e.g., a fingerprint sensor), the biometric sensor may obtain biometric information (e.g., a fingerprint image) corresponding to a touch input received via a portion of the display 210. As another example, when the sensor module 176 embedded in the display device 160 includes a pressure sensor, the pressure sensor may obtain pressure information corresponding to a touch input received via a partial or whole area of the display 210. According to an embodiment, the touch sensor 251 or the sensor module 176 may be disposed between pixels in a pixel layer of the display 210, or over or under the pixel layer.

An electronic device (for example, the electronic device 101 of FIG. 1) according to various embodiments may include a display panel (for example, the display panel 310 of FIG. 3), a DDI (for example, the DDI 230 of FIG. 2) configured to drive the display panel 310, a processor (for example, the processor 120 of FIG. 1) configured to generate first image data to be displayed by the display panel 310, and an image-processing module (for example, the image-processing module 320 of FIG. 3), wherein the image-processing module 320 may be configured to determine a target gamma curve (for example, the target gamma curve 504 of FIG. 5) related to the first image data, receive a request for switching a scan rate of the display panel 310 from a first frequency to a second frequency, determine a gamma offset (for example, the gamma offset 510 of FIG. 5) for changing a first gamma curve corresponding to the first frequency to a second gamma curve corresponding to the second frequency and an offset margin (for example, the offset margin 520 of FIG. 5) additionally configured by the display panel in response to reception of the request, determine a limit gamma curve (for example, the limit gamma curve 503 of FIG. 5) generated by applying the gamma offset 510 and the offset margin 520 to the first gamma curve, generate second image data by correcting the first image data, based on a difference value between the limit gamma curve 503 and the target gamma curve 504, to map the first image data to the target gamma curve 504, and drive the display panel 310, based on the second image data and the limit gamma curve 503.

According to an embodiment, the image-processing module 320 may be configured to acquire offset information indicating a range of a variable offset from the display panel 310 and calculate the offset margin 520, based on the range of the offset.

According to an embodiment, the image-processing module 320 may be configured to drive the display panel 310, based on the first image data and the target gamma curve 504, when first luminance values corresponding to the limit gamma curve 503 are larger than or equal to second luminance values corresponding to the target gamma curve 504.

According to an embodiment, the image-processing module 320 may be configured to drive the display panel 310, based on the second image data and the limit gamma curve 503 when the first luminance values corresponding to the limit gamma curve 503 are smaller than the second luminance values corresponding to the target gamma curve 504.

According to an embodiment, the image-processing module 320 may be configured to calculate the difference value between the limit gamma curve 503 and the target gamma curve 504 when the first luminance values corresponding to the limit gamma curve 503 are smaller than the second luminance values corresponding to the target gamma curve 504, and generate the second image data by applying a correction value corresponding to the difference value to the first image data.

According to an embodiment, at least a portion of the image-processing module 320 may be included in the processor 120.

According to an embodiment, at least a portion of the image-processing module 320 may be included in the DDI 230.

According to an embodiment, the image-processing module 320 may be configured to calculate grayscale distribution of the first image data for every area on an entire screen to be displayed by the display panel 310, determine whether a first condition indicating that an external illuminance acquired through a sensor module of the electronic device 101 is larger than a first reference illuminance value, an average luminance of the entire screen is larger than the first reference luminance value, and a low grayscale area has a ratio within a predetermined range over the entire screen is satisfied, generate a first target gamma curve 504 by increasing a first luminance step in the low grayscale area and decreasing a second luminance step of a middle grayscale area and a third luminance step of a high grayscale area when the first condition is satisfied, and drive the display panel 310, based on the second image data, generated based on the first target gamma curve 504, and the limit gamma curve 503.

According to an embodiment, the image-processing module 320 may be configured to calculate grayscale distribution of the first image data for every area on an entire screen to be displayed by the display panel 310, determine whether a second condition indicating that an external illuminance acquired through a sensor module of the electronic device 101 is equal to or smaller than a first reference illuminance value and an average luminance of the entire screen is smaller than a second reference luminance value is satisfied, generate a second target gamma curve 504 by decreasing a first luminance step in a low grayscale area of the entire screen and increasing a first luminance value of a middle grayscale area and a second luminance value of a high grayscale area of the entire screen when the second condition is satisfied, and drive the display panel 310, based on the second image data, generated based on the second target gamma curve 504, and the limit gamma curve 503.

According to an embodiment, the image-processing module 320 may be configured to generate the target gamma curve 504, based on mura information of the display panel 310 and burn-in history information of the display panel 310.

A method of an electronic device (for example, the electronic device 101 of FIG. 1) according to various embodiments may include an operation of determining a target gamma curve (for example, the target gamma curve 504 of FIG. 5) related to first image data to be displayed by a display panel (for example, the display panel 310 of FIG. 3), an operation of receiving a request for switching a scan rate of the display panel 310 from a first frequency to a second frequency, an operation of determining a gamma offset (for example, the gamma offset 510 of FIG. 5) for changing a first gamma curve corresponding to the first frequency to a second gamma curve corresponding to the second frequency and an offset margin (for example, the offset margin 520 of FIG. 5) additionally configured by the display panel in response to reception of the request, an operation of determining a limit gamma curve (for example, the limit gamma curve 503 of FIG. 5) generated by applying the gamma offset 510 and the offset margin to the first gamma curve, an operation of generating second image data by correcting the first image data, based on a difference value between the limit gamma curve 503 and the target gamma curve 504, to map the first image data to the target gamma curve 504, and an operation of driving the display panel 310, based on the second image data and the limit gamma curve 503.

According to an embodiment, the method may further include an operation of acquiring offset information indicating a range of a variable offset from the display panel 310 and an operation of calculating the offset margin 520, based on the range of the offset.

According to an embodiment, the method may further include an operation of driving the display panel 310, based on the first image data and the target gamma curve 504 when first luminance values corresponding to the limit gamma curve 503 are larger than or equal to second luminance values corresponding to the target gamma curve 504.

According to an embodiment, the method may further include an operation of driving the display panel 310, based on the second image data and the limit gamma curve 503 when the first luminance values corresponding to the limit gamma curve 503 are smaller than the second luminance values corresponding to the target gamma curve 504.

According to an embodiment, the method may further include an operation of calculating the difference value between the limit gamma curve 503 and the target gamma curve 504 when the first luminance values corresponding to the limit gamma curve 503 are smaller than the second luminance values corresponding to the target gamma curve 504 and an operation of generating the second image data by applying a correction value corresponding to the difference value to the first image data.

According to an embodiment, at least some of the operation of determining of the target gamma curve 504, the operation of determining of the gamma offset 510 and the offset margin 520, the operation of determining the limit gamma curve 503, and the operation of generating the second image data may be performed by the processor 120 of the electronic device 101.

According to an embodiment, at least some of the operation of determining of the target gamma curve 504, the operation of determining of the gamma offset 510 and the offset margin 520, the operation of determining the limit gamma curve 503, and the operation of generating the second image data may be performed by the DDI 230 of the electronic device 101.

According to an embodiment, the method may further include an operation of calculating grayscale distribution of the first image data for every area on an entire screen to be displayed by the display panel 310, an operation of determining whether a first condition indicating that an external illuminance acquired through a sensor module of the electronic device 101 is larger than a first reference illuminance value, an average luminance of the entire screen is larger than the first reference luminance value, and a low grayscale area has a ratio within a predetermined range over the entire screen is satisfied, an operation of generating a first target gamma curve 504 by increasing a first luminance step in the low grayscale area and decreasing a second luminance step of a middle grayscale area and a third luminance step of a high grayscale area when the first condition is satisfied, and an operation of driving the display panel 310, based on the second image data, generated based on the first target gamma curve 504, and the limit gamma curve 503.

According to an embodiment, the method may further include an operation of calculating grayscale distribution of the first image data for every area on an entire screen to be displayed by the display panel 310, an operation of determining whether a second condition indicating that an external illuminance acquired through a sensor module of the electronic device 101 is equal to or smaller than a first reference illuminance value and an average luminance of the entire screen is smaller than a second reference luminance value is satisfied, an operation of generating a second target gamma curve 504 by decreasing a first luminance step in a low grayscale area of the entire screen and increasing a first luminance value of a middle grayscale area and a second luminance value of a high grayscale area of the entire screen when the second condition is satisfied, and an operation of driving the display panel 310, based on the second image data, generated based on the second target gamma curve 504, and the limit gamma curve 503.

According to an embodiment, the operation of generating the target gamma curve 504 may include an operation of generating the target gamma curve 504, based on mura information of the display panel 310 and burn-in history information of the display panel 310.

Figure 3:
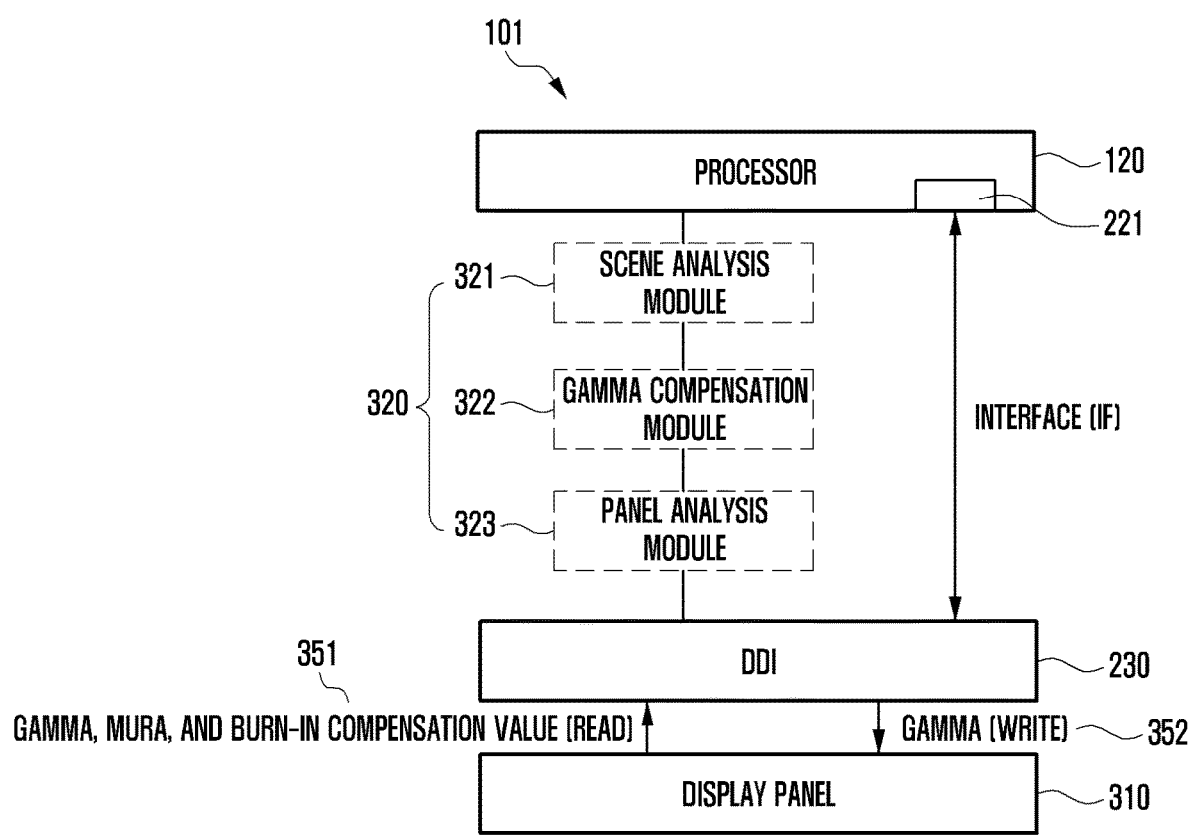
FIG. 3 is a block diagram of an electronic device illustrating an image-processing module according to an embodiment.

FIG. 3 is a block diagram of the electronic device 101 illustrating an image processing module 320 according to an embodiment.

Referring to FIG. 3, the electronic device 101 (for example, the electronic device 101 of FIG. 1) according to an embodiment may include the image-processing module 320 for controlling a gamma curve to fit a screen corresponding to image data or the image data on the basis of mura information of a display panel 310, burn-in history information of the display panel 310, and a scan rate of the display panel 310.

According to an embodiment, the image-processing module 320 may improve image quality by combining an image-processing method performed in an image domain and an image-processing method of controlling the gamma curve in a display domain.

According to an embodiment, the image-processing method performed in the image domain may be, for example, a method of converting image data by the processor 120 or the DDI 230 (for example, the DDI 230 of FIG. 2). For example, the image-processing method performed in the image domain may include an image-processing process for converting data of grayscale levels 0 to 255 with bit depth of 8 bits to be mapped to specific luminance values. If the electronic device 101 corrects image data using only the image-processing method performed in the image domain, the image quality may be poor due to the grayscale banding phenomenon (for example, image equalization phenomenon or contour phenomenon) in which a plurality of grayscale values corresponding to a specific grayscale section are mapped to one luminance value. In order to solve the problem, the processor 120 (or the DDI 230) is required to additionally perform additional complex image-processing methods, but these methods may increase power consumption of the electronic device 101 and thus they may not be suitable for mobile electronic devices such as a smartphone.

According to an embodiment, the image-processing method of controlling the gamma curve in the display domain may include an image-processing process for directly controlling the gamma curve of the display panel 310. For example, the image-processing method of controlling the gamma curve in the display domain may include an operation for generating a tone mapping function (TMF) that changes the form of the gamma curve by applying a gamma offset 510 to the gamma curve used to drive the display panel 310.

According to an embodiment, the display panel 310 may have a unique luminance and a unique color according to the type of the display panel 310. A display module (for example, the display module 160) may store gamma data in order to compensate for deviation of the luminance and deviation of the color of the display panel 310. The gamma data may be expressed in the form of the gamma curve, and the gamma offset 510 may be applied to the gamma curve on the basis of a specific reference value. According to an embodiment, the gamma offset 510 is a delta value added to the gamma curve, and may be used to correct characteristics different in every display panel 310 and, when the scan rate of the display panel 310 is changed, correct the luminance and the color.

The electronic device 101 according to certain embodiments may change the form of the gamma curve according to the TMF to prevent the grayscale banding phenomenon by the image-processing method performed in the image domain, thereby providing visually smooth image quality.

The electronic device 101 according to certain embodiments may improve the image quality without a significant increase in power consumption by combining the image-processing method performed in the image domain and the image-processing method of controlling the gamma curve in the display domain.

According to an embodiment, the image-processing module 320 may include a scene analysis module 321, a gamma compensation module 322, and a panel analysis module 323. According to certain embodiments, the image-processing module 320 may further include at least one module for performing operations of the image-processing module 320 described below as well as the scene analysis module 321, the gamma compensation module 322, and the panel analysis module 323. According to certain embodiments, at least a portion of the image-processing module 320 may be included in the processor 120 or the DDI 230. For example, at least some of the scene analysis module 321, the gamma compensation module 322, and the panel analysis module 323 may be included in the processor 120 or the DDI 230. Accordingly, at least some of the operations of the image-processing module 320 described in this document may be performed by the processor 120 or the DDI 230. Hereinafter, for convenience of description, it is described that the image-processing module 320 is an element independent from the processor 120 and the DDI 230.

According to an embodiment, the scene analysis module 321 may analyze one or more characteristics of the image data generated (for example, rendered) by the processor 120 and determine a target gamma curve (for example, a target gamma curve 504 of FIG. 5) on the basis of the analysis result. For example, the scene analysis module 321 may analyze image data transmitted from the processor 120 to the DDI 230 through the interface terminal 221 of the processor 120 and determine the target gamma curve 504 according to the TMF. For example, an interface (IF) through which the processor 120 and the DDI 230 transmit and receive data may comply with the mobile industry processor interface (MIPI) standard.

According to an embodiment, the gamma compensation module 322 may acquire (for example, read) information related to the current gamma curve from the display panel 310 as indicated by reference numeral 351 and calculate a gamma offset (for example, the gamma offset 510 of FIG. 5) for switching the current gamma curve to the target gamma curve 504 analyzed by the scene analysis module 321. According to an embodiment, when the calculation of the gamma offset 510 is completed, the gamma compensation module 322 may perform an operation 352 of changing the form of the gamma curve by applying the gamma offset 510 to the current gamma curve and writing the changed gamma curve on the display panel 310.

According to an embodiment, the panel analysis module 323 may acquire (for example, read) mura information of the display panel 310 and burn-in history information of the display panel 310 from the display panel 310 and determine a gamma compensation value for compensating for feature deviation of the panel 310. For example, the panel analysis module 323 may determine a gamma compensation value for compensating for luminance deviation and color deviation generated by at least one of color deviation in an area of the display panel 310, an amount of the use of the display panel 310, a use pattern of the display panel 310, or a reduction in luminance of the display due to display usage. According to an embodiment, the panel analysis module 323 may transmit the determined gamma compensation value to the gamma compensation module 322, and the gamma compensation module 322 may change the form of the gamma curve on the basis of the gamma offset 510 and the gamma compensation value.

According to certain embodiments, the DDI 230 may include the image-processing module 320 and analyze a frame characteristic of image data received from the processor 120. The frame characteristic may refer to the distribution of grayscale values in the image data or contrast derived from distribution of grayscale values. The DDI 230 may acquire external illuminance of the electronic device 101 detected by the sensor module 176 from the processor 120. The DDI 230 may determine the optimized target gamma curve 504 on the basis of an environment condition around the electronic device 101 such as external illuminance and the analysis result of the frame characteristic.

According to certain embodiments, the display panel 310 may be a variable driving panel which may vary its scan rate. When the display panel 310 is a variable driving panel, the characteristic of the display panel 310 may vary depending on the scan rate of the display panel 310. When the scan rate of the display panel 310 is changed, it is possible to correct a corresponding change in the characteristic by applying the gamma offset 510 to the gamma curve. According to an embodiment, a margin of the gamma offset 510 applied by the display panel 310 may be limited. For example, when the DDI 230 applies the gamma offset 510 according to the change in the scan rate of the display panel 310, an offset margin (for example, offset margin 520 of FIG. 5) which can be additionally configured by the display panel 310 may be determined. For example, when the DDI 230 increases the gamma offset 510 according to the change in the scan rate of the display panel 310, the offset margin 520 may be reduced.

According to another embodiment, the processor 120 may include the image-processing module 320 and analyze the frame characteristic of image data to be transmitted to the DDI 230. The frame characteristic may refer to the distribution of grayscale values included in a specific frame or contrast derived from distribution of grayscale value. The processor 120 may acquire external illuminance of the electronic device 101 through the sensor module 176. The processor 120 may determine the optimized target gamma curve 504 on the basis of an environment condition around the electronic device 101 such as external illuminance and the analysis result of the frame characteristic.

According to another embodiment, the display panel 310 may be a variable driving panel which may vary a scan rate. When the display panel 310 is a variable driving panel, the characteristic of the display panel 310 may vary depending on the scan rate of the display panel 310. When the scan rate of the display panel 310 is changed, it is possible to corresponding correct a change in the characteristic by applying the gamma offset 510 to the gamma curve. According to an embodiment, a margin of the gamma offset 510 applied by the display panel 310 may be limited. For example, when the processor 120 applies the gamma offset 510 according to the change in the scan rate of the display panel 310, the offset margin 520 which can be additionally configured by the display panel 310 may be determined. For example, when the processor 120 increases the gamma offset 510 according to the change in the scan rate of the display panel 310, the offset margin 520 may be reduced.

Figure 4:
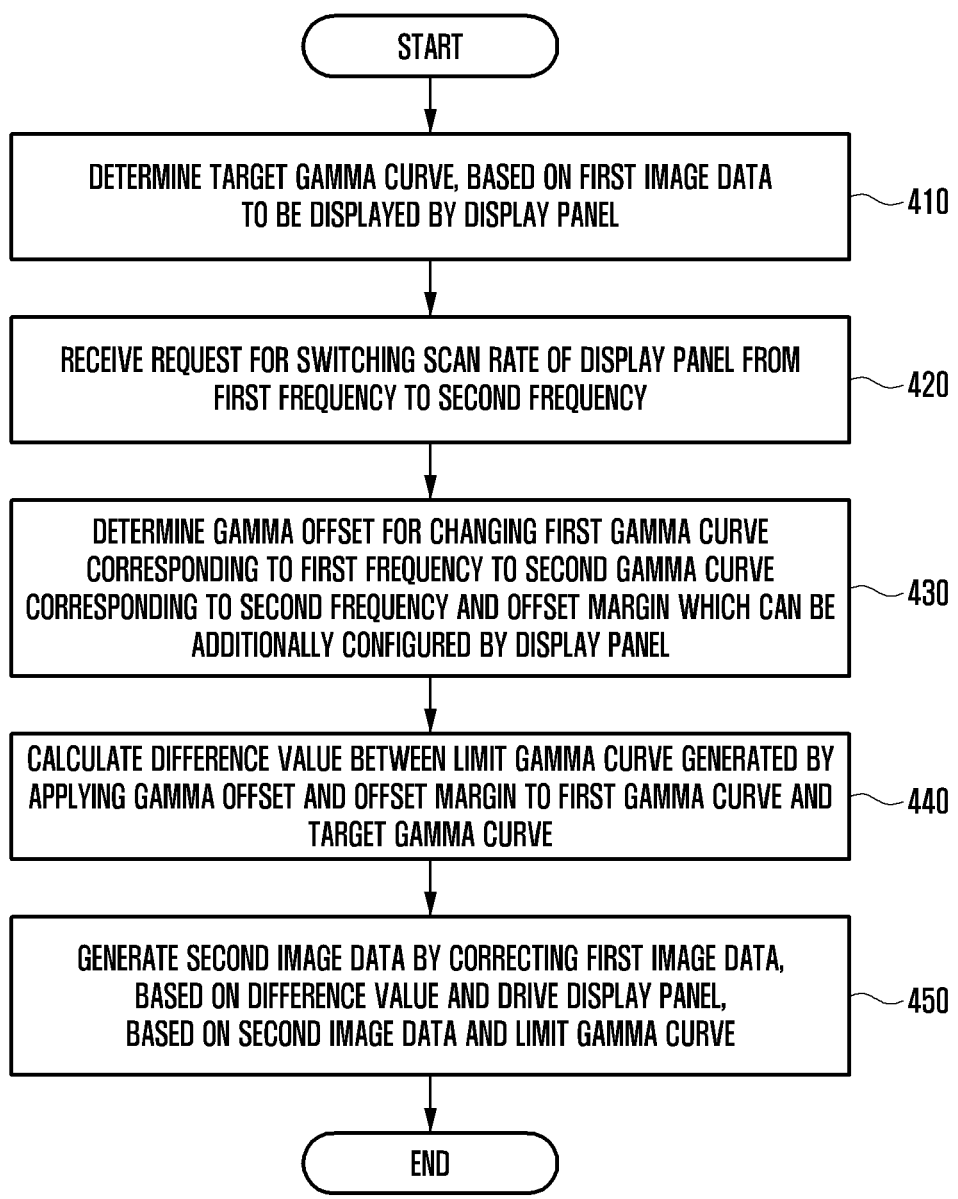
FIG. 4 is a flowchart illustrating an operation of an image-processing module according to an embodiment.

FIG. 4 is a flowchart illustrating the operation of the image-processing module 320 according to an embodiment.

Figure 5:
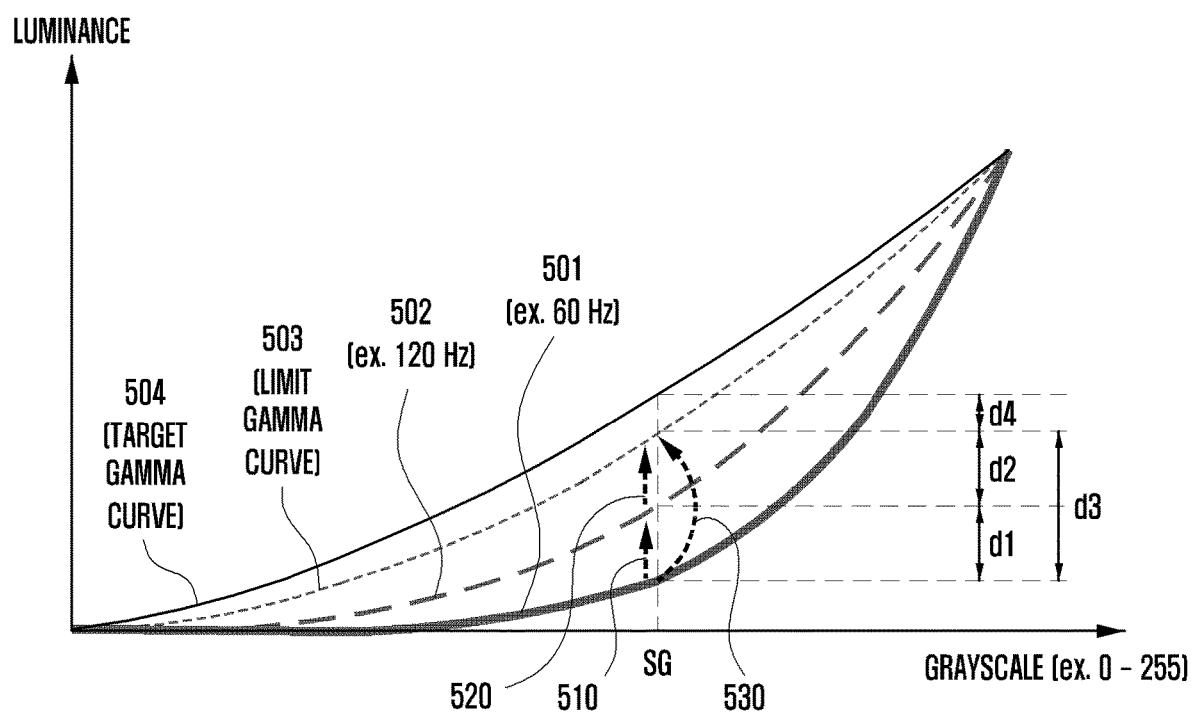
FIG. 5 is an example illustrating gamma curves controlled by an image-processing module according to an embodiment.

FIG. 5 illustrates gamma curves controlled by the image-processing module 320 according to an embodiment.

In FIG. 5, the horizontal axis indicates grayscale and the vertical axis indicates luminance. In FIG. 5, the curve 501 is a first gamma curve 501 according to a first frequency (for example, 60 Hz), the curve 502 is a second gamma curve 502 according to a second frequency (for example, 120 Hz), the curve 503 is a limit gamma curve 503 according to the offset margin 520 of the display panel 310, and the curve 504 is a target gamma curve 504 determined by the image-processing module 320.

According to an embodiment, at least some of the operations illustrated in FIG. 4 may be performed by the processor 120 (for example, the processor 120 of FIG. 1). For example, a memory (for example, the memory 130 of FIG. 1) of the electronic device 101 may store instructions causing the processor 120 to perform at least some operations illustrated in FIG. 4 when executed.

According to another embodiment, at least some of the operations illustrated in FIG. 4 may be performed by the DDI 230 (for example, the DDI 230 of FIG. 2). For example, the processor 120 of the electronic device 101 may control the DDI 230 to perform at least some operations illustrated in FIG. 4. According to still another embodiment, at least some of the operations illustrated in FIG. 4 may be performed by the image-processing module 320 as a separate component from the processor 120 or the DDI 230. The processor 120, the DDI 230, and/or the image-processing module 320 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed as means-plus-function, unless the element is expressly recited using the phrase "means for." In addition, an artisan understands and appreciates that a "processor" or "microprocessor" may be hardware in the claimed disclosure.

According to certain embodiments, at least some of the operations illustrated in FIG. 4 may be omitted.

According to certain embodiments, before or after at least some of the operations illustrated in FIG. 4, another operation of the image-processing module 320 described in this document may be performed. For example, the operations illustrated in FIG. 4 may be combined with other operations of the image-processing module 320 described in this document.

Hereinafter, the operation of the image-processing module 320 according to certain embodiments is described with reference to FIGS. 4 and 5.

In operation 410, an image-processing module (for example, the image-processing module 320 of FIG. 3) according to an embodiment may determine the target gamma curve 504 on the basis of first image data to be displayed by a display panel (for example, the display panel 310 of FIG. 3). The image-processing module may analyze a frame characteristic of the first image data. For example, the frame characteristic may refer to the distribution of grayscale values or contrast derived from distribution of grayscale values. The image-processing module may determine the optimized target gamma curve 504 on the basis of the analysis result of the frame characteristic.

In operation 420, the image-processing module 320 according to an embodiment may receive a request for switching the scan rate of the display panel 310 from a first frequency to a second frequency. For example, the image-processing module 320 may receive the request while the current scan rate is the first frequency. According to certain embodiments, the scan rate of the display panel 310 may be changed to various rates such as 1 Hz, 10 Hz, 15 Hz, 20 Hz, 24 Hz, 30 Hz, 48 Hz 60 Hz, 90 Hz, 96 Hz, 120 Hz, or 240 Hz.

In operation 430, the image-processing module 320 according to an embodiment may determine a gamma offset 510 for changing the first gamma curve 501 according to the first frequency to the second gamma curve 502 corresponding to the second frequency. The image-processing module 320 may determine the offset margin 520 which can be additionally configured by the display panel 310 on which the gamma offset 510 is determined.

For example, as illustrated in FIG. 5, the first frequency may be 60 Hz and the second frequency may be 120 Hz. Referring to FIG. 5, the image-processing module 320 may determine the gamma offset 510 for changing the first gamma curve 501 corresponding to the first frequency (for example, 60 Hz) to the second gamma curve 502 corresponding to the second frequency (for example, 120 Hz). When the gamma offset 510 is determined, the image-processing module 320 may determine the offset margin 520 which can be additionally configured by the display panel 310. For example, the image-processing module 320 may acquire offset information indicating a variable offset range 530 from the display panel 310. When the offset range 530 corresponds to d3 as illustrated in FIG. 5, the image-processing module 320 may determine d2 of the offset margin 520 by subtracting d1 of the gamma offset 510 from d3 of the offset range 530.

In operation 440, the image-processing module 320 according to an embodiment may generate the limit gamma curve 503 by applying the gamma offset 510 and the offset margin 520 to the first gamma curve 501. For example, as illustrated in FIG. 5, when the gamma offset 510 is applied to the first gamma curve 501, luminance according to the first gamma curve 501 at specific grayscale (SG) may increase by d1 and thus mapping to the second gamma curve 502 may be performed. When the offset margin 520 is additionally applied to the second gamma curve 502, luminance according to the second gamma curve 502 at the specific grayscale (SG) may increase by d2 and thus mapping to the limit gamma curve 503 may be performed.

According to an embodiment, the image-processing module 320 may calculate a difference value between the generated limit gamma curve 503 and the target gamma curve 504. For example, the limit gamma curve 503 may be the limit curve of gamma correction which can be processed in the display domain. Referring to FIG. 5, the image-processing module 320 may calculate the difference value (for example, d4 of FIG. 5) when first luminance values according to the limit gamma curve 503 are smaller than second luminance values corresponding to the target gamma curve 504.

In operation 450, the image-processing module 320 according to an embodiment may generate second image data by correcting the first image data on the basis of the calculated difference value. The image-processing module 320 may drive the display panel 310 on the basis of the generated second image data and the limit gamma curve 503.

According to an embodiment, the difference value between the limit gamma curve 503 and the target gamma curve 504 may be a value targeted by additional image processing in the image domain. For example, the image-processing module 320 may generate second image data by performing an image-processing process for converting data in the grayscale range from 0 to 255 included in the first image data to be mapped to specific luminance values on the basis of the difference value. For example, difference between a first luminance value according to the limit gamma curve 503 and a second luminance value corresponding to the target gamma curve 504 at the specific grayscale (SG) may be d4, and the image-processing module 320 may generate second image data by correcting the first image data on the basis of d4 of the difference value.

According to an embodiment, when the second image data is generated, the image-processing module 320 may drive the display panel 310 on the basis of the second image data and the limit gamma curve 503.

Figure 6:
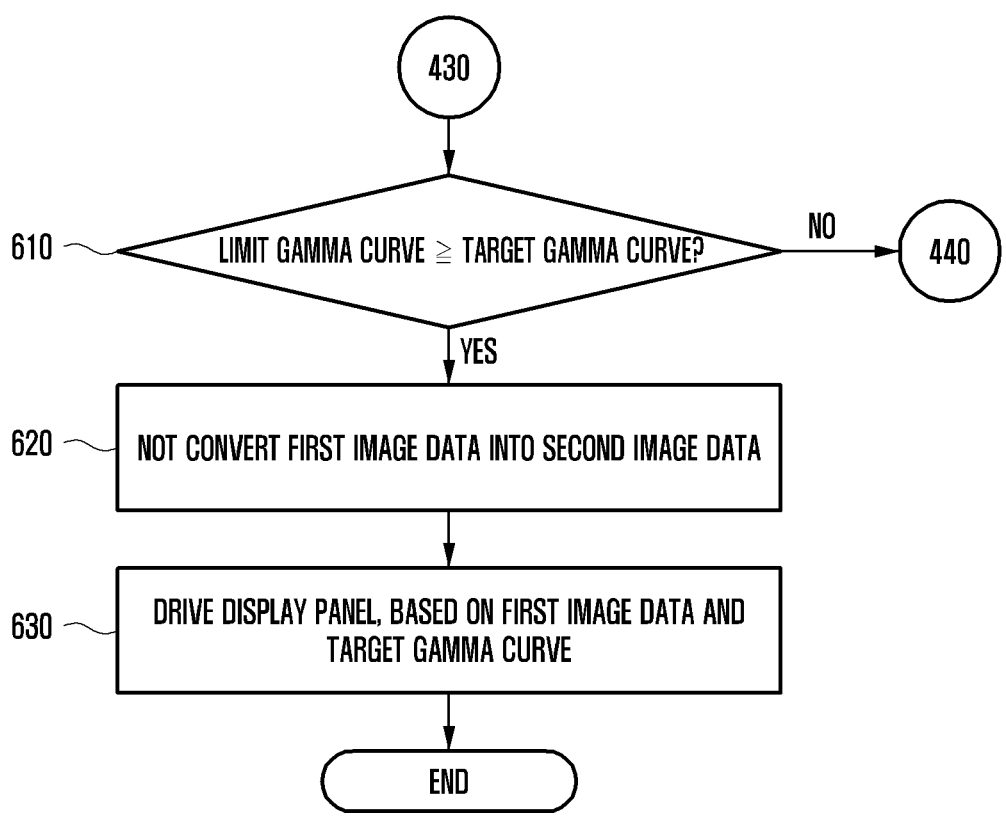
FIG. 6 is an operation flowchart illustrating an operation in which an image-processing module compares a limit gamma curve and a target gamma curve according to an embodiment.

FIG. 6 is an operation flowchart illustrating the operation in which the image-processing module 320 compares the limit gamma curve 503 and the target gamma curve 504 according to an embodiment.

According to an embodiment, at least some of the operations illustrated in FIG. 6 may be performed by the processor 120 (for example, the processor 120 of FIG. 1). For example, a memory (for example, the memory 130 of FIG. 1) of the electronic device 101 may store instructions causing the processor 120 to perform at least some operations illustrated in FIG. 6 when executed.

According to another embodiment, at least some of the operations illustrated in FIG. 6 may be performed by the DDI 230 (for example, the DDI 230 of FIG. 2). For example, the processor 120 of the electronic device 101 may control the DDI 230 to perform at least some operations illustrated in FIG. 6. According to still another embodiment, at least some of the operations illustrated in FIG. 6 may be performed by the image-processing module 320 as a separate component from the processor 120 or the DDI 230.

According to certain embodiments, at least some of the operations illustrated in FIG. 6 may be omitted.

According to certain embodiments, before or after at least some of the operations illustrated in FIG. 6, another operation of the image-processing module 320 described in this document may be performed. For example, the operations illustrated in FIG. 6 may be combined with other operations of the image-processing module 320 described in this document, According to certain embodiments, the operations illustrated in the flowchart of FIG. 6 may be operations performed after operation 430 of FIG. 4. For example, operation 610 of FIG. 6 may be an operation after operation 430 of FIG. 4.

Hereinafter, an operation in which an image-processing module (for example, the image-processing module 320 of FIG. 3) according to certain embodiments compares a limit gamma curve (for example, the limit gamma curve 503 of FIG. 5) and the target gamma curve (for example, the target gamma curve 504 of FIG. 5) is described with reference to FIG. 6.

In operation 610, the image-processing module 320 according to an embodiment may identify whether first luminance values according to the limit gamma curve 503 are larger than or equal to second luminance values corresponding to the target gamma curve 504. For example, unlike the example illustrated in FIG. 5, the first luminance values according to the limit gamma curve 503 may be larger than or equal to the second luminance values corresponding to the target gamma curve 504.

According to an embodiment, when the first luminance values according to the limit gamma curve 503 are larger than or equal to the second luminance values corresponding to the target gamma curve 504 (for example, "Yes" of the result of operation 610), the image-processing module 320 may perform operation 620.

According to an embodiment, when the first luminance values according to the limit gamma curve 503 are smaller than the second luminance values corresponding to the target gamma curve 504 (for example, "No" of the result of operation 610), the image-processing module 320 may perform operation 440 in FIG. 4.

In operation 620, the image-processing module 320 according to an embodiment may not convert first image data into second image data. For example, when the first luminance values according to the limit gamma curve 503 are larger than or equal to the second luminance values corresponding to the target gamma curve 504 (for example, "Yes" of the result of operation 610), the first gamma curve 501 corresponding to the first frequency may be directly converted into the target gamma curve 504 in the display domain, and thus separate image processing of conversion of first image data into second image data may not be needed.

In operation 630, the image-processing module 320 according to an embodiment may drive the display panel 310 on the basis of the first image data and the target gamma curve 504. For example, the image-processing module 320 may convert the first gamma curve 501 corresponding to the first frequency into the target gamma curve 504, perform an operation of writing the converted target gamma curve 504 on the display panel 310, and drive the display panel 310 to display first image data on the basis of the target gamma curve 504.

Figure 7:
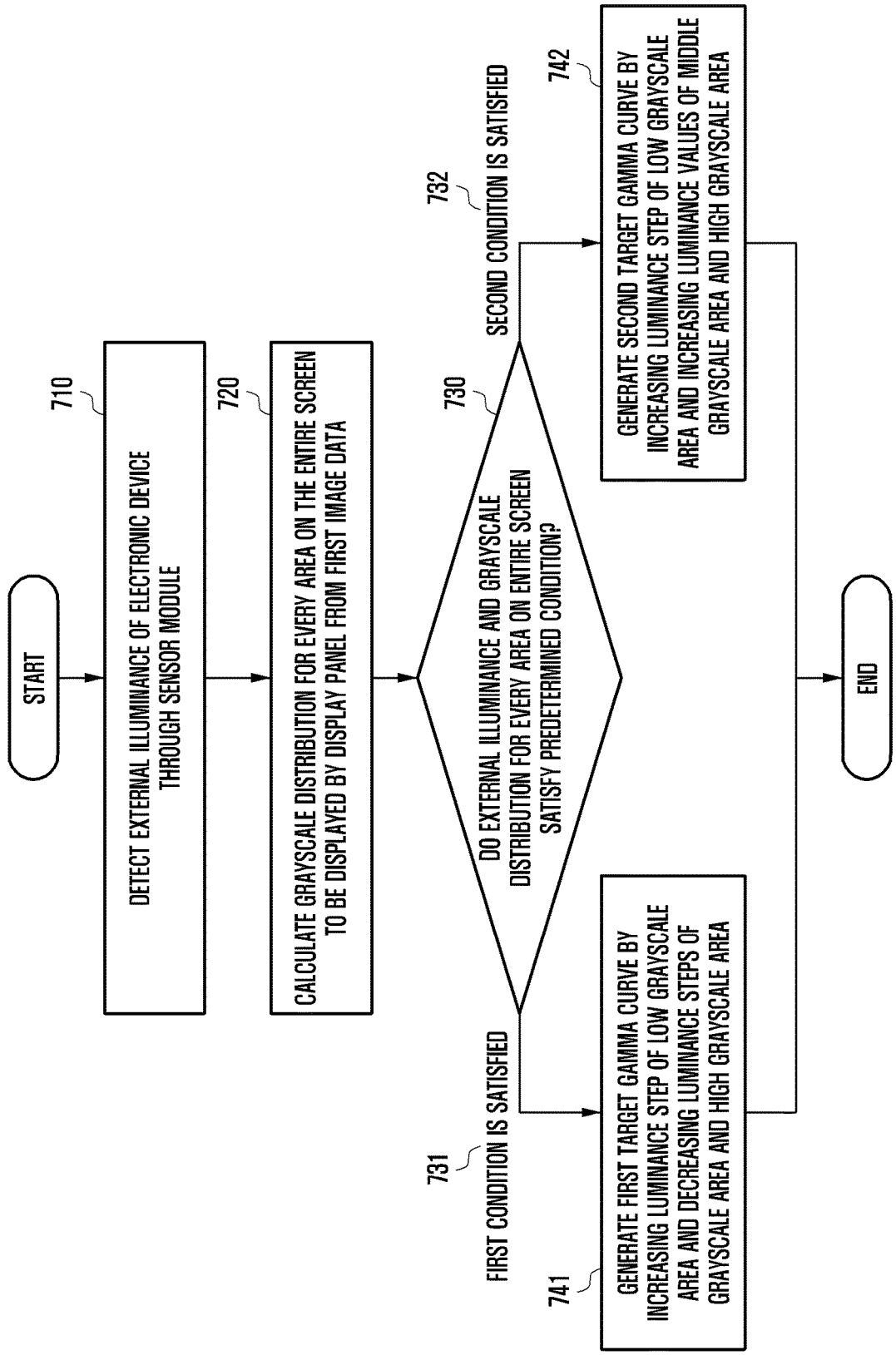
FIG. 7 is an operation flowchart illustrating a method by which an image-processing module controls a target gamma curve according to an embodiment.

FIG. 7 is an operation flowchart illustrating a method by which the image-processing module 320 controls the target gamma curve 504 according to an embodiment.

FIG. 8A is an example illustrating first image data satisfying a first condition and a default gamma curve according to an embodiment. FIG. 8B is an example illustrating a result obtained by correcting first image data satisfying the first condition to second image data by the image-processing module 320 according to an embodiment.

FIG. 9A illustrates first image data satisfying a second condition and a default gamma curve according to an embodiment. FIG. 9B is an example illustrating a result obtained by correcting first image data satisfying the second condition to second image data by the image-processing module 320 according to an embodiment.

Figure 10:
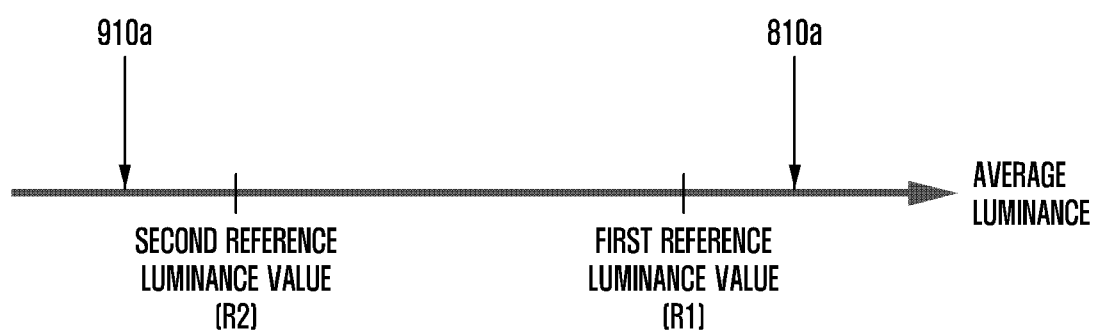
FIG. 10 is an example illustrating a reference luminance value according to an embodiment.

FIG. 10 is an example illustrating a reference luminance value according to an embodiment.

According to an embodiment, at least some of the operations illustrated in FIG. 7 may be performed by the processor 120 (for example, the processor 120 of FIG. 1). For example, a memory (for example, the memory 130 of FIG. 1) of the electronic device 101 may store instructions causing the processor 120 to perform at least some operations illustrated in FIG. 7 when executed.

According to another embodiment, at least some of the operations illustrated in FIG. 7 may be performed by the DDI 230 (for example, the DDI 230 of FIG. 2). For example, the processor 120 of the electronic device 101 may control the DDI 230 to perform at least some operations illustrated in FIG. 7. According to still another embodiment, at least some of the operations illustrated in FIG. 7 may be performed by the image-processing module 320 as a separate component from the processor 120 or the DDI 230.

According to certain embodiments, at least some of the operations illustrated in FIG. 7 may be omitted.

According to certain embodiments, before or after at least some of the operations illustrated in FIG. 7, another operation of the image-processing module 320 described in this document may be performed. For example, the operations illustrated in FIG. 7 may be combined with other operations of the image-processing module 320 described in this document, Hereinafter, a method by which the image-processing module 320 controls the target gamma curve 504 according to certain embodiments is described with reference to FIGS. 7 to 10.

In operation 710, an image-processing module (for example, the image-processing module 320 of FIG. 3) according to an embodiment may detect external illuminance of the electronic device 101 through a sensor module (for example, the sensor module 176 of FIG. 1). According to an embodiment, the image-processing module 320 may determine whether the electronic device 101 is located indoors or outdoors by analyzing the external illuminance of the electronic device (for example, the electronic device 101 of FIG. 1). For example, when the external illuminance acquired through the sensor module 176 is larger than a first reference illuminance value, the image-processing module 320 may determine that the electronic device 101 is located outdoors. When the external illuminance acquired through the sensor module 176 is equal to or smaller than the first reference illuminance value, the image-processing module 320 may determine that the electronic device 101 is located indoors.

In operation 720, the image-processing module 320 according to an embodiment may calculate distribution of grayscale for every area in the entire screen to be displayed by the display panel 310 from first image data. According to an embodiment, the image-processing module 320 may divide the entire grayscale of the first image data into a plurality of groups. For example, the image-processing module 320 may divide the entire grayscale into a low grayscale area (LG), a middle grayscale area (MG), and a high grayscale area (HG) and calculate an area in which the low grayscale area (LG) is distributed on the entire screen, an area in which the middle grayscale area (MG) is distributed in the entire screen, and an area in which the high grayscale area (HG) is distributed on the entire screen.

According to an embodiment, the image-processing module 320 may approximately equally divide grayscale 0 to the highest grayscale, for example, grayscale 255 into three equal parts to configure the low grayscale area (LG), the middle grayscale area (MG), and the high grayscale area (HG). For example, the image-processing module 320 may configure grayscale 0 to about grayscale 80 as the low grayscale area (LG), about grayscale 80 to about grayscale 160 as the middle grayscale area (MG), and about grayscale 160 to grayscale 255 as the high grayscale area (HG).

According to another embodiment, the image-processing module 320 may classify grayscale values included in the entire screen in the form of a histogram, and configure the low grayscale area (LG), the middle grayscale area (MG), and the high grayscale area (HG) according to histogram distribution. In this case, one or more of the grayscale ranges corresponding to the low grayscale area (LG), the middle grayscale area (MG), and the high grayscale area (HG) configured by the image-processing module 320 may be dynamically changed.

In operation 730, the image-processing module 320 according to an embodiment may determine whether external illuminance and grayscale distribution for every area on the entire screen satisfy a predetermined condition. According to certain embodiments, the predetermined condition may include a first condition and a second condition.

For example, first image data satisfying the first condition may be image data in which the average luminance of the entire screen is larger than a first reference luminance value (for example, first reference luminance value (R1) of FIG. 10) and the low grayscale area (LG) has a ratio within a predetermined range over the entire screen as illustrated in FIG. 8A.

For example, the first image data satisfying the second condition may be image data in which the average luminance of the entire screen is smaller than a second reference luminance value (for example, second reference luminance value (R2) of FIG. 10) as illustrated in FIG. 9A.

According to an embodiment, when the external illuminance acquired through the sensor module 176 is larger than the first reference illuminance value, the average luminance of the entire screen according to the first image data is larger than the first reference luminance value (R1), and the low grayscale area (LG) has a ratio within a predetermined range over the entire screen, the image-processing module 320 may determine that the first condition is satisfied (for example, "731" of the result of operation 730). When the first condition is satisfied (for example, "731" of the result of operation 730), the image-processing module 320 may perform operation 741.

According to an embodiment, when the external illuminance acquired through the sensor module 176 is equal to or smaller than the first reference illuminance value and the average luminance of the entire screen according to the first image data is smaller than a second reference luminance value (for example, second reference luminance value (R2) of FIG. 10), the image-processing module 320 may determine that the second condition is satisfied (for example, "732" of the result of operation 730). When the second condition is satisfied (for example, "732" of the result of operation 730), the image-processing module 320 may perform operation 742.

According to certain embodiments, as illustrated in FIG. 10, the first reference luminance value (R1) may be larger than the second reference luminance value (R2). For example, as illustrated in FIG. 8A, when the average luminance of the entire screen (for example, 810a of FIG. 8A) according to the first image data is larger than the first reference luminance value (R1), the image-processing module 320 may determine that the corresponding image data is a bright image. For example, as illustrated in FIG. 9A, when the average luminance of the entire screen according to the first image data is smaller than the second reference luminance value (R2), the image-processing module 320 may determine that the corresponding image data is a dark image.

When it is determined that the electronic device 101 is located outdoors since the first image data is a bright image and the external illuminance is larger than the first reference illuminance value (for example, "731" of the result of operation 730), the image-processing module 320 may generate a first target gamma curve 820b by increasing a luminance step (S1) of the low grayscale area (LG) and decreasing respective luminance steps (S2 and S3) of the middle grayscale area (MG) and the high grayscale area (HG) in operation 741.

The process in which the image-processing module 320 generates the first target gamma curve 820b is described below.

Referring to FIG. 8A, in the default gamma curve 820a, as grayscale increases, luminance steps (for example, luminance increments) (S1, S2, and S3) may increase. For example, in the default gamma curve 820a, a third luminance step (for example, third luminance increment S3) corresponding to the high grayscale area (HG) may be larger than a second luminance step (for example, second luminance increment S2) corresponding to the middle grayscale area (MG), which in turn may be larger than a first luminance step (for example, first luminance increment S1) corresponding to the low grayscale area (LG).

When the image-processing module 320 displays the image capturing a bright scene but also includes portions of the low grayscale area (LG), such as first image data 810a, on the basis of the default gamma curve 820a, the displaying is intensively concentrated on the low grayscale area (LG) and details or visibility of some objects (for example, sky or clouds) may be reduced since areas corresponding to the middle grayscale area (MG) and the high grayscale area (HG) may be compressed due to the large luminance difference between grayscale. Further, in an outdoor environment in which surrounding illuminance is relatively high, details in dark areas may not be clearly visible to the user, and thus using the default gamma curve 820a in such an external environment may cause unnecessary rendering of shadow detail or details in dark areas. The image-processing module 320 according to an embodiment may move the compression areas from the middle grayscale area (MG) and the high grayscale area (HG) to the low grayscale area (LG) to achieve an image (for example, 810b of FIG. 8B) having improved details and visibility by increasing the luminance step (S1) of the low grayscale area (LG) through conversion of the display gamma and improving the display on areas corresponding to the middle grayscale area (MG) and the high grayscale area (HG).

According to an embodiment, when the first condition is satisfied, the image-processing module 320 may generate the first target gamma curve 820b by increasing the luminance step (S1) of the low grayscale area (LG) and decreasing the respective luminance steps (S2 and S3) of the middle grayscale area (MG) and the high grayscale area (HG) as illustrated in FIG. 8B. For example, a first luminance step (for example, first luminance increment S1-1) of FIG. 8B according to the first target gamma curve 820b may be larger than the first luminance step (for example, the first luminance increment S1) of FIG. 8A according to the default gamma curve 820a. For example, a second luminance step (for example, a second luminance increment S2-1) of FIG. 8B according to the first target gamma curve 820b may be smaller than the second luminance step (for example, the second luminance increment S2) of FIG. 8A according to the default gamma curve 820a. For example, a third luminance step (for example, a third luminance increment S3-1) of FIG. 8B according to the first target gamma curve 820b may be smaller than the third luminance step (for example, the third luminance increment S3) of FIG. 8A according to the default gamma curve 820a.

According to an embodiment, the image-processing module 320 may generate second image data (for example, 810b of FIG. 8A) by correcting the first image data (for example, 810a of FIG. 8A) on the basis of the first target gamma curve 820b and may drive the display panel 310 on the basis of the second image data and the limit gamma curve 503.

When it is determined that the electronic device 101 is located indoors since the first image data is a dark image and the external illuminance is equal to or smaller than the first reference illuminance value (not shown) (for example, "732" of the result of operation 730), the image-processing module 320 according to an embodiment may generate a second target gamma curve 920b by increasing the luminance step (S1) of the low grayscale area (LG) and increasing luminance values of the middle grayscale area (MG) and the high grayscale area (HG) in operation 742.

The process in which the image-processing module 320 generates the second target gamma curve 920b is described below.

Referring to FIG. 9A, in a default gamma curve 920a, as grayscale increases, luminance steps (for example, luminance increases) may increase.

According to an embodiment, when the second condition is satisfied, the image-processing module 320 may generate the second target gamma curve 920b by increasing the luminance step (S1) of the low grayscale area (LG) and increasing the luminance values of the middle grayscale area (MG) and the high grayscale area (HG) as illustrated in FIG. 9B. For example, a first luminance step (for example, a first luminance increment S1-2) of FIG. 9B according to the second target gamma curve 920b may be larger than the first luminance step (for example, the first luminance increment S1) of FIG. 9A according to the default gamma curve 920a. For example, the luminance value of the middle grayscale area (MG) and the luminance values of the high grayscale area (HG) of FIG. 9B according to the second target gamma curve 920b may be more than (i.e. increased from) the luminance value of the middle grayscale area (MG) and the luminance values of the high grayscale area (HG) according to the default gamma curve 920a as marked by arrows 931 of FIG. 9B.

According to an embodiment, the image-processing module 320 may generate the second image data (for example, 910b of FIG. 9B) by correcting the first image data (for example, 910a of FIG. 9A) on the basis of the second target gamma curve 920b and may drive the display panel 310 on the basis of the second image data 910b and the limit gamma curve 503.

As illustrated in FIG. 9A, when the electronic device 101 displays a dark screen or image in an indoor environment, the image-processing module 320 may perform a display gamma conversion of decreasing the luminance step of the low grayscale area (LG) and increasing the luminance values mapped to grayscale in the middle grayscale area (MG) and the high grayscale area (HG), thereby increasing overall contrast of the screen and improving visibility.

According to certain embodiments, when a luminance characteristic or a color characteristic of the display panel 310 is changed from initial characteristics (for example, when display burn-in is generated), the image-processing module 320 may compensate for burn-in of the deteriorated area by combining the image-processing method performed in the image domain and correction of the gamma offset 510 performed in the display domain. For example, the image-processing module 320 may detect the deteriorated area of the display panel 310 and compensate for burn-in of the deteriorated area by performing image processing based on burn-in information of the deteriorated area and applying a gamma offset (for example, the gamma offset 510 of FIG. 5) to the gamma curve.

Certain of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

While the present disclosure has been shown and described with reference to various embodiments thereof, it will be understood by those skilled in the art that various changes in form and details may be made therein without departing from the present disclosure as defined by the appended claims and their equivalents.

What is claimed is:

1. An electronic device comprising:
a display panel;
a display driver IC (DDI) configured to drive the display panel;
a processor configured to generate first image data to be displayed by the display panel; and
an image-processing module,
wherein the image-processing module is configured to:
determine a target gamma curve related to the first image data,
receive a request for switching a scan rate of the display panel from a first frequency to a second frequency,
determine a gamma offset for changing a first gamma curve corresponding to the first frequency to a second gamma curve corresponding to the second frequency and an offset margin additionally configured by the display panel in response to reception of the request,
determine a limit gamma curve generated by applying the gamma offset and the offset margin to the first gamma curve,
generate second image data by correcting the first image data, based on a difference value between the limit gamma curve and the target gamma curve to map the first image data to the target gamma curve, and
drive the display panel, based on the second image data and the limit gamma curve.

2. The electronic device of claim 1, wherein the image-processing module is configured to acquire offset information indicating a range of a variable offset from the display panel and calculate the offset margin, based on the range of the offset.

3. The electronic device of claim 1, wherein the image-processing module is configured to drive the display panel, based on the first image data and the target gamma curve when first luminance values corresponding to the limit gamma curve are larger than or equal to second luminance values corresponding to the target gamma curve.

4. The electronic device of claim 3, wherein the image-processing module is configured to drive the display panel, based on the second image data and the limit gamma curve when the first luminance values corresponding to the limit gamma curve are smaller than the second luminance values corresponding to the target gamma curve.

5. The electronic device of claim 4, wherein the image-processing module is configured to calculate the difference value between the limit gamma curve and the target gamma curve when the first luminance values corresponding to the limit gamma curve are smaller than the second luminance values corresponding to the target gamma curve, and generate the second image data by applying a correction value corresponding to the difference value to the first image data.

6. The electronic device of claim 1, wherein at least a portion of the image-processing module is included in the processor.

7. The electronic device of claim 1, wherein at least a portion of the image-processing module is included in the DDI.

8. The electronic device of claim 1, wherein the image-processing module is configured to:
calculate grayscale distribution of the first image data for every area on an entire screen to be displayed by the display panel,
determine whether a first condition indicating that an external illuminance acquired through a sensor module of the electronic device is larger than a first reference illuminance value, an average luminance of the entire screen is larger than the first reference luminance value, and a low grayscale area has a ratio within a predetermined range over the entire screen is satisfied,
generate a first target gamma curve by increasing a first luminance step in the low grayscale area and decreasing a second luminance step of a middle grayscale area and a third luminance step of a high grayscale area when the first condition is satisfied, and
drive the display panel, based on the second image data, generated based on the first target gamma curve, and the limit gamma curve.

9. The electronic device of claim 1, wherein the image-processing module is configured to:
calculate grayscale distribution of the first image data for every area on an entire screen to be displayed by the display panel,
determine whether a second condition indicating that an external illuminance acquired through a sensor module of the electronic device is equal to or smaller than a first reference illuminance value and an average luminance of the entire screen is smaller than a second reference luminance value is satisfied,
generate a second target gamma curve by decreasing a first luminance step in a low grayscale area of the entire screen and increasing a first luminance value of a middle grayscale area and a second luminance value of a high grayscale area of the entire screen when the second condition is satisfied, and
drive the display panel, based on the second image data, generated based on the second target gamma curve, and the limit gamma curve.

10. The electronic device of claim 1, wherein the image-processing module is configured to generate the target gamma curve, based on mura information of the display panel and burn-in history information of the display panel.

11. A method of an electronic device, the method comprising:
determining a target gamma curve related to first image data to be displayed by a display panel;
receiving a request for switching a scan rate of the display panel from a first frequency to a second frequency;
determining a gamma offset for changing a first gamma curve corresponding to the first frequency to a second gamma curve corresponding to the second frequency and an offset margin additionally configured by the display panel in response to reception of the request;
determining a limit gamma curve generated by applying the gamma offset and the offset margin to the first gamma curve;
generating second image data by correcting the first image data, based on a difference value between the limit gamma curve and the target gamma curve to map the first image data to the target gamma curve; and
driving the display panel, based on the second image data and the limit gamma curve.

12. The method of claim 11, further comprising:
acquiring offset information indicating a range of a variable offset from the display panel; and
calculating the offset margin, based on the range of the offset.

13. The method of claim 11, further comprising driving the display panel, based on the first image data and the target gamma curve when first luminance values corresponding to the limit gamma curve are larger than or equal to second luminance values corresponding to the target gamma curve.

14. The method of claim 13, further comprising driving the display panel, based on the second image data and the limit gamma curve when the first luminance values corresponding to the limit gamma curve are smaller than the second luminance values corresponding to the target gamma curve.

15. The method of claim 14, further comprising:
calculating the difference value between the limit gamma curve and the target gamma curve when the first luminance values corresponding to the limit gamma curve are smaller than the second luminance values corresponding to the target gamma curve; and
generating the second image data by applying a correction value corresponding to the difference value to the first image data.

16. The method of claim 11, wherein the determining of the target gamma curve, the determining of the gamma offset and the offset margin, the determining of the limit gamma curve, and/or the generating of the second image data are performed by a processor of the electronic device.

17. The method of claim 11, wherein the determining of the target gamma curve, the determining of the gamma offset and the offset margin, the determining of the limit gamma curve, and/or the generating of the second image data are performed by a display driver IC (DDI) of the electronic device.

18. The method of claim 11, further comprising:
calculating grayscale distribution of the first image data for every area on an entire screen to be displayed by the display panel;
determining whether a first condition indicating that an external illuminance acquired through a sensor module of the electronic device is larger than a first reference illuminance value, an average luminance of the entire screen is larger than the first reference luminance value, and a low grayscale area has a ratio within a predetermined range over the entire screen is satisfied;
generating a first target gamma curve by increasing a first luminance step in the low grayscale area and decreasing a second luminance step of a middle grayscale area and a third luminance step of a high grayscale area when the first condition is satisfied; and
driving the display panel, based on the second image data, generated based on the first target gamma curve, and the limit gamma curve.

19. The method of claim 11, further comprising:
calculating grayscale distribution of the first image data for every area on an entire screen to be displayed by the display panel;
determining whether a second condition indicating that an external illuminance acquired through a sensor module of the electronic device is equal to or smaller than a first reference illuminance value and an average luminance of the entire screen is smaller than the first reference illuminance value is satisfied;
generating a second target gamma curve by decreasing a first luminance step in a low grayscale area of the entire screen and increasing a first luminance value of a middle grayscale area and a second luminance value of a high grayscale area of the entire screen when the second condition is satisfied; and
driving the display panel, based on the second image data, generated based on the second target gamma curve, and the limit gamma curve.

20. The method of claim 11, wherein the generating of the target gamma curve comprises generating the target gamma curve, based on mura information of the display panel and burn-in history information of the display panel.

* * * * *